United States Patent [19]

Cavallaro

[11] Patent Number: 4,679,959
[45] Date of Patent: Jul. 14, 1987

[54] QUICK-CONNECT/DISCONNECT CONNECTOR

[75] Inventor: Paul V. Cavallaro, Canton, Mass.

[73] Assignee: The United States of America as represented by the Secretary of the Army, Washington, D.C.

[21] Appl. No.: 919,956

[22] Filed: Oct. 16, 1986

[51] Int. Cl.⁴ .......................... F16C 3/00; F16C 11/00
[52] U.S. Cl. .................................... 403/143; 403/141; 403/317; 24/597
[58] Field of Search ............... 403/122, 143, 144, 317, 403/325, 327, 348, 349, 141; 24/597, 590, 591

[56] References Cited

U.S. PATENT DOCUMENTS

| | | |
|---|---|---|
| 867,162 | 9/1907 | Seidl . |
| 2,976,876 | 3/1961 | Lonnqvist . |
| 3,253,310 | 5/1966 | McCarthy ........................ 403/326 X |
| 3,345,710 | 10/1967 | Bush ........................ 24/597 |
| 3,345,711 | 10/1967 | McCarthy ........................ 403/166 X |
| 3,466,715 | 9/1969 | McCarthy ........................ 403/187 X |
| 3,482,291 | 12/1969 | Lehmann ........................ 403/122 X |
| 3,982,841 | 9/1976 | Endzweig . |
| 4,216,567 | 8/1980 | Heinz ........................ 24/597 X |

FOREIGN PATENT DOCUMENTS 1429924 3/1976 United Kingdom ................ 403/349

Primary Examiner—Andrew V. Kundrat
Attorney, Agent, or Firm—Lawrence E. Labadini

[57] ABSTRACT

The invention is a mechanical device which enables the connection of two preferably longitudinal rigid members. Utilization of the invention enables the quick connection and disconnection of members manually without the aid of tools. The device is designed such that the connection is positively locked. The connection is also characterized in that torques and bending moments will not be transmitted between the two connected members through the device. The device, however, will transmit tensile, compressive, and shear loads.

7 Claims, 6 Drawing Figures

QUICK-CONNECT/DISCONNECT CONNECTOR

The invention described herein may be manufactured, used, and licensed by or for the Government for Governmental purposes without the payment to me of any royalty thereon.

FIELD OF THE INVENTION

This invention relates to a quick connect/disconnect mechanism, its uses include military applications in which structures such as tent frames, shelters, trusses, etc. or any system requiring rapid deployment capability with quick assembly/disassembly features are necessary. The invention is also applicable, for instance, to mechanical testing systems requiring quick and easy specimen installation as well as the elimination of eccentric loading effects, robotics, aircraft and aerospace structures, automobiles, rigging situations, general manufacturing, etc.

BACKGROUND OF THE INVENTION

Several existing devices are useful for the temporary connection of the ends of members; none of these devices, however, contain the complete features and advantages of the present invention. U.S. Pat. No. 3,482,291 covering a quick-release universal-movement coupling is of some relevance to the present invention. While this invention embodies a quick release ball and socket type arrangement, it does not have a distinctive separate securing and positive locking system as is embodied in the instant invention. Further, the '291 patent is not designed nor suited for extensive compression loads as its primary purpose is to couple or fasten two parts together. Finally, its ball and socket mechanism are not fully covered and thus not completely protected from the adverse effects of outside elements.

U.S. Pat. No. 3,466,715 is also relevant to the instant invention and is distinguishable on many of the same grounds mentioned above with respect to the '291 patent. Additionally, the '715 patent does not disclose a torque-free arrangement.

U.S. Pat. Nos. 3,253,310 and 3,345,711 disclose releaseable couplings or fasteners and are thereby relevant to the present invention. These patents, however, do not disclose a flexible joint between the connected parts. Additionally, a torque-free connection is not taught by these patents; nor is a positive locking system which completely encloses the securing pin.

SUMMARY OF THE INVENTION

Previous quick-connectors transferred damaging bending moments within frame members resulting in the failure of joints. The present invention provides a positive locking, momentless, quick-connect/disconnect connector which does not transfer these damaging bending moments. The connector permits unrestrained relative rotational motion between the two joined members. Additionally, a certain degree of unrestrained pivotal motion is permitted between the members. Within these ranges of free motion, only tensile, compressive and shear loads are transferred between the members joined. Bending moments and torques are not transferred.

Design modifications of the components of the invention will allow for compatibility of the connector for application with other various structural members. The method of attachment used to secure the connector could vary according to the materials and types of structural members being joined. Manufacturing methods may consist of machine, casting, molding, injection molding, etc. or any combinatin depending on the materials being used such as steel, aluminum, composites, plastics, etc. Additionally, the degree of unrestrained motion may be modified for different applications by changing the various tolerances and clearances of various components of the invention. The specific changes necessary for such a modification will be discussed in detail later.

Installation of the connector when in a structure such as a tent frame is relatively simple. Ends of the device may be connected to the members to be joined in any combination of several ways. The ends may be bolted, adhesively bonded, threaded, or welded to their respective members.

The invention further comprises a positive locking system designed to not be susceptible to vibrations or shock. Further, the design of the locking system is such that environmental effects, such as dirt and ice, will not interfere with the operation of the connector. Also, as the locking system is contained largely within the device itself, its pieces are not exposed to hazards which may cause damage to the locking system.

Several new patentable features are incorporated into this particular design which include the quick-connect/disconnect concept built into a connector with non-transferrable moment and torque load capability, the separate positive locking mechanism, the controllable degree of unrestrained pivoting motion, the ball-socket method of connection, and high tensile, compressive, and shear loading capacity.

As has been made clear from the above discussion of the prior art, other existing quick-connect/disconnects are limited to only a few of the above features thus reducing the number of applications in which a quick-connect/disconnect may be utilized. This particular design does not use any dangling components or require the use of any tools during the connect/disconnect operation.

DETAILED DESCRIPTION OF THE PREFERRED EMBODIMENT

Figure 1:
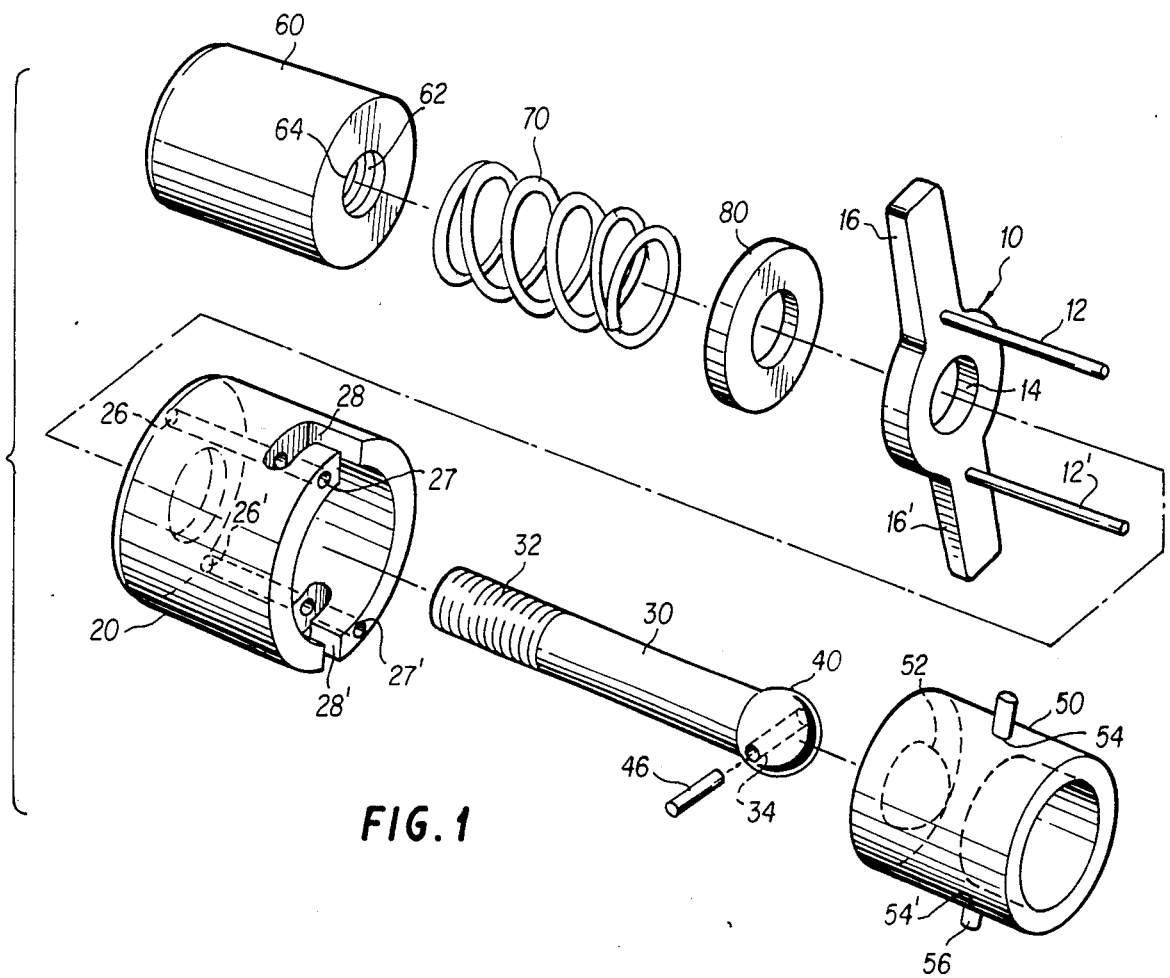
FIG. 1 is an exploded perspective view of a quick connect/disconnect mechanism that is constructed in accordance with one embodiment of the invention.

The invention comprises several elements which may be assembled and disassembled by hand; additionally, as discussed above, once assembled the invention is manipulable by hand. Two pieces of the invention connect the invention to each of the two members that are to be connected. FIG. 1 shows first member extension 60 and second member extension 50 each of which attach to respective ends of the members to be joined. Methods of attachment of these two pieces are discussed above.

First member extension 60 and indeed all parts of the invention as shown in FIG. 1 are of essentially cylindrical cross section. While this embodiment is preferred in the instant disclosure of the invention, the cylindrical shapes are not essential throughout the entirety of the invention for its proper function.

Through the center of first member 60 is an aperture 64 with threads 62. These threads receive the threads 32 on shaft 30. At the opposite end of shaft 30 is a spherical head 40 which is secured to shaft 30 by pin 46 which slides through aperture 34. Said aperture is formed by the insertion of head 40 on shaft 30 and is comprised of an aperture through shaft 30 and two apertures on either side within head 40.

Figure 2:
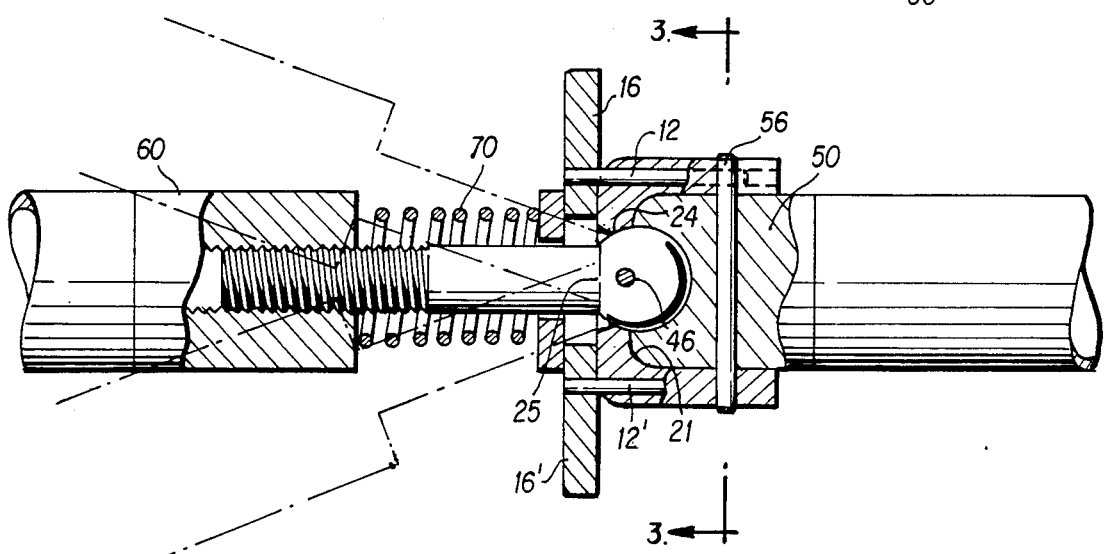
FIG. 2 shows a part elevation, part axial section of the mechanism in its secured and locked position; free motion of part of the invention is also shown by the phamtom lines.
Figure 3:
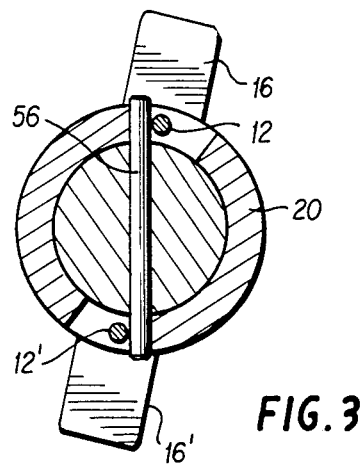
FIG. 3 is a section taken on line 3—3 of FIG. 2, looking in the direction of the arrows.

The threaded engagement of shaft 30 with first member extension 60 retains four additional pieces of the invention; these pieces together comprise one member side of the connector. Moving from the spherical head 40 toward first member extension 60, sleeve 20 is the first component. Sleeve 20 normally rests up against spherical head 40 about shaft 30 as shown in FIG. 2. Sleeve web 21 with aperture 25 and bearing surface 24 allow the sleeve to slide freely along shaft 30 and also to rest against spherical head 40 as shown in FIG. 2.

The next component in the series is slide member 10. Aperture 14 on said slide member allows this component to also slide freely along shaft member 30. Said aperture may be considerably larger in diameter than shaft 30, the reasons for these differences in diameters will be discussed below. Projecting axially from slide member 10 are two locking pins 12, 12', see FIG. 1. These locking pins slide freely within apertures 26, 27, and 26', 27', of sleeve 20. FIG. 2 shows these locking pins fully seated into the apertures of sleeve 20.

The next component just behind slide member 10 is back-up washer 80 as shown in FIGS. 1 and 2. Said back-up washer retains compression spring 70 which is located between said back-up washer and first extension member 60. See FIGS. 1 and 2.

The other half of the connector is comprised of second member extension 50 which attached to its corresponding member. Retainer pin 56 projects through either side of second member extension 50 and passes through apertures 54, 54'. Bearing surface 52 is semi-spherical in shape corresponding to the shape of spherical head 40; see FIG. 1.

Once assembled as described above, the invention is hand-articulatable and performs two basic functions. The first function basically involves the securing in detachable fashion of the ends of two members. This is accomplished quickly and easily by the insertion of second member extension 50 into sleeve 20. Element 50 is inserted into element 20 such that the protruding ends of retainer pin 56 aligned with the two slots 28, 28' in sleeve 20.

As shown in FIG. 1, the slots 28, 28' are generally L-shaped in the preferred embodiment. Thus, to secure element 50 within sleeve 20, element 50 in sleeve 20 must be rotated relative to each other once retainer pin 56 is inserted axially into the two grooves. Once secured, the spherical head 40 is seated within the sleeve bearing surface 24 of the sleeve 20 and the bearing surface 52 of second member extension 50. Said surfaces cover nearly the entire surface of the head; further, the surfaces match the surface of the head as to protect against entry of foreign material between the bearing surfaces.

As has been described and is evident from FIG. 2, once the two members are secured shaft 30 may freely rotate within bearing surface 52 and sleeve bearing surface 24. Additionally, the shaft is free to pivot within a certain range, thus describing a conical volume of free pivoting motion, see FIG. 2. These freedoms of motion, account for the torqueless and momentless characteristics of the connector which were described above. The degree of unrestrained motion may be modified for different applications by changing the diameters of the sleeve aperture 25 and the slide member aperture 14. Should the slide aperture be increased to exceed the diameter of the compression spring 70, then the backup washer 80 is necessary to retain the spring between the slide 10 and first member extension 60. Otherwise, the washer 80 is not necessary.

The second characteristic feature of the invention is its positively acting locking ability. This locking ability is a mechanism which positively locks the connected joint once secured in the above-described fashion. The locking system is comprised basically of compression spring 70 and slide member 10. As is shown in FIG. 2, locking pins 12, 12' of slide member 10 fit through apertures 26, 27, and 26', 27' of sleeve 20.

Figure 4:
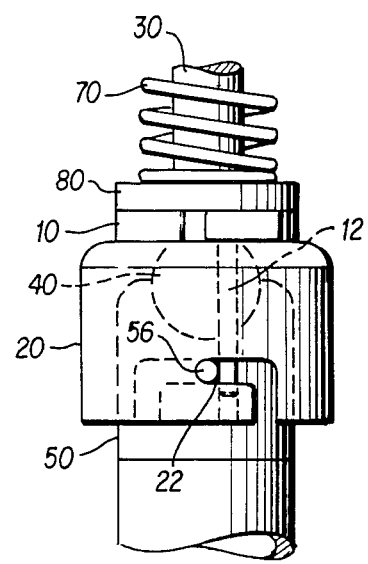
FIG. 4 is a fragmentary plan view of the mechanism in its secured and locked position showing details of the securing and locking features in phantom.
Figure 5A:
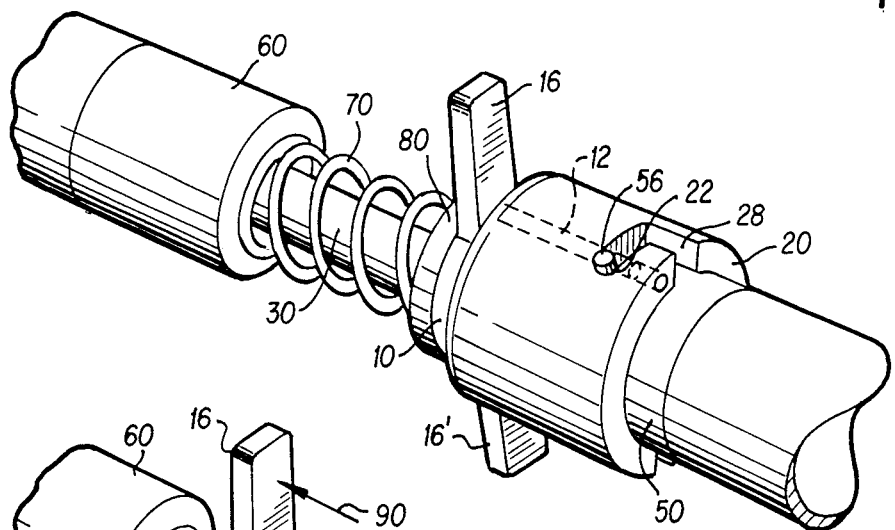
FIGS. 5A and 5B are perspective views of the mechanism, with FIG. 5A showing the mechanism as assembled, and FIG. 5B showing one position of the mechanism during disconnection, with phantom lines included to aid in the illustration of the procedure.

These pins 12, 12' are configured such that they slide freely within the apertures in sleeve 20. Once slide member 10 is fully seated against sleeve 20, the locking pins create two closed spaces 22 and 22', see FIG. 4 and FIG. 5A (22' is not shown). These spaces 22, 22' serve to contain the ends of retainer pin 56 once the connector pieces have been secured as described above. Once the locking pins 12, 12' are in place securing the ends of retainer pin 56, compression spring 70 positively urges slide member 10 against sleeve 20 thus keeping locking pins 12, 12' in place.

Having fully described the interactions of the individual parts of the invention, the procedures involved in the complete connect and disconnect processes will now be fully explained. Operation is quick and easy as was intended. To connect two members, the slide 10 is pulled back by hand to retract the locking pins 12, 12' in the apertures 26, 27, and 26', 27' of the sleeve 20. Retraction by hand is made very easy by the addition of tabs 16, 16' on the slide member. The sleeve is then positioned over the second member extension 50 so as to align retainer pin 56 in the grooves 28, 28'. Rotation of sleeve 20 fully seats the retainer pin 56 at the ends of the grooves. The slide 10 is then released to secure the retainer pin 56 in proper position. Compression spring 70 insures that the locking pins 12, 12' are always fully engaged within the sleeve apertures such that unintentional disconnection cannot occur. (i.e.: due to shock, vibration, etc.)

Figure 5B:
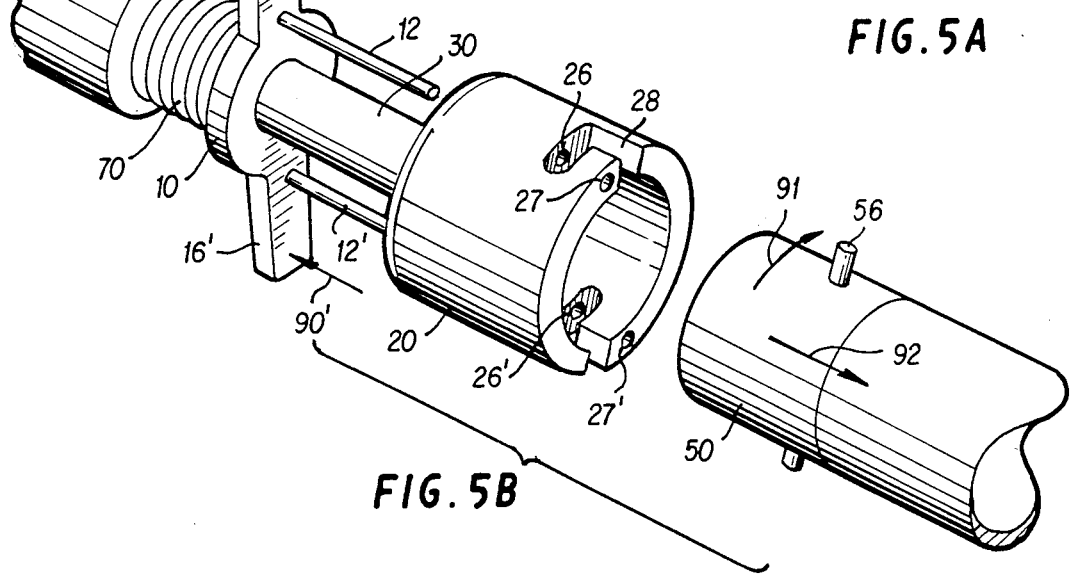

To disconnect the structural members, the procedure is reversed. Slide 10 is pulled away from the collar to retract the locking pins 12, 12' in the sleeve apertures. See FIG. 5B, where arrows 90, 90' show the retraction motion of slide 10. FIG. 5B shows locking pins 12, 12' being fully retracted out of the apertures in sleeve 20; the threaded engagement between shaft 30 and first member extension 60 may be adjusted, however, such that travel of slide member 10 is limited and full retraction of the locking pins 12, 12' out of sleeve 20 is not possible. Such an embodiment is preferred so that environmental effects such as dirt and ice will not interfere with the operation of the connector. Additionally, as mentioned above, this also prevents the locking pins 12, 12' from becoming bent and damaged.

To complete the disconnection process, sleeve 20 and second member extension 50 are rotated relative to each other as shown in FIG. 5B by arrow 91; this relative rotation unseats the securing pin 56 and the sleeve is then pulled away from the second member extension, see arrow 92.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. Means for detachably connecting together a first member and a second member, comprising:
    a shaft;
    means for securing one end of said shaft to said first member;
    said shaft being formed with a generally spherical head at its end remote from said first member;
    said second member being formed with a generally semi-spherical recess in one face thereof for receiving therein the generally spherical shaft head; and with at least one redially projecting retainer rod;
    a slide member that is mounted for sliding movement on said shaft intermediate said first member and said shaft head, said slide member being formed with at least one pin that projects axially of said shaft from said slide member and toward said second member;
    a sleeve adapted to seat about the end of said second member, said sleeve being generally cup-shaped and formed with a web portion and with an annular wall, said web being formed with an aperture to receive said shaft therethrough but to prevent passage of said shaft head therethrough, the annular wall of said sleeve being formed with at lease one axially-extending opening for the receptin of said pin or pins therein and with at least one generally L-shaped slot for receiving therein said retainer rod on said second member upon assembly of said sleeve about the end of said second member and manipulation of said sleeve to seat said retainer rod in said slot; and
    urging means disposed to constantly urge said slide member in its assembled position toward the end of said second member.

2. The apparatus of claim 1 wherein the first and second members, shaft and sleeve are of generally cylindrical cross section.

3. The apparatus of claim 1 wherein the urging means is a compression spring disposed about said shaft and between said first member and said slide.

4. The apparatus of claim 3 further comprising a washer disposed about said shaft and between said spring and said slide.

5. The apparatus of claim 1 wherein the slide has at least one tab fixedly attached thereto to facilitate manual manipulation of said slide.

6. The apparatus of claim 1 wherein the means for securing said shaft to said first member is a threaded securing means.

7. The apparatus of claim 1 wherein the urging means is disposed to constantly urge said slide member in a position such that the slide member pin or pins are inserted within the axially extending opening or openings of the sleeve and the retainer rod of the second member is thus positively enclosed and locked within the generally L-shaped slot or slots of the sleeve upon assembly of said first member and said second member.

* * * * *